United States Patent [19]

Yano et al.

[11] 4,303,400
[45] Dec. 1, 1981

[54] MARINE PROPULSION DEVICE

[75] Inventors: Kazuhiko Yano, Toyonaka; Kazuhiko Ohtsuki, Takarazuka, both of Japan

[73] Assignee: Kanzaki Kokyukoki Mfg. Co., Ltd., Amagasaki, Japan

[21] Appl. No.: 79,445

[22] Filed: Sep. 27, 1979

[30] Foreign Application Priority Data

Oct. 7, 1978 [JP] Japan .................. 53-123858

[51] Int. Cl.³ .............................................. B63H 23/06
[52] U.S. Cl. ................................ 440/75; 74/416; 74/606 R
[58] Field of Search ................. 440/75; 64/21; 74/606 R, 416, 438; 192/51, 21

[56] References Cited

U.S. PATENT DOCUMENTS

| | | | |
|---|---|---|---|
| 2,130,125 | 9/1938 | Fromm | 440/75 |
| 2,924,985 | 2/1960 | Crankshaw | 74/416 X |
| 3,324,682 | 6/1967 | Bendler | 64/21 |
| 3,327,550 | 6/1967 | Robb | 74/606 X |
| 3,636,909 | 1/1972 | Benson, Jr. | 440/75 |

*Primary Examiner*—Sherman D. Basinger

[57] ABSTRACT

In the marine V-drive or similar drive system, a novel gearing is employed which provides a bend or turn of power transmission path toward a rearwardly and downwardly inclined propeller shaft in a compact fashion. The gearing comprises a pair of mutually meshed spur gears respectively mounted on a reversing clutch output shaft and a transmission shaft to which the propeller shaft is coupled. Among these spur gears, a first spur gear coaxial with the shaft mounting such first gear is fixedly secured to the said shaft. A second spur gear inclined relative to the shaft mounting such gear is connected operatively to the said shaft particularly by means of constant velocity universal joint disposed within the second gear. The inventive propulsion device is economical owing to the elimination of bevel gear mechanism.

3 Claims, 14 Drawing Figures

MARINE PROPULSION DEVICE

BACKGROUND OF THE INVENTION

This invention relates to a novel marine propulsion device which is suitable for use in conjunction with boats such as pleasure boats including yachts and motor boats. More particularly, the present invention relates to a novel marine propulsion device of the type comprising an engine which is mounted at a stern portion of boat, a propeller shaft which extends outwardly from the hull at a stern part along a rearwardly and downwardly inclined direction and which is equipped at the terminal end thereof with a propeller, clutch mechanism for transmitting power from said engine toward said propeller shaft selectively into the forward direction or backward direction of boat propulsion, and gearing means for connecting clutch output shaft of said clutch mechanism drivingly to said propeller shaft. The gearing means set forth above includes a transmission shaft which is aligned coaxially with the propeller shaft and is fixedly coupled to such propeller shaft.

A typical example of marine propulsion devices of the type set forth above is devices of so-called V-drive system. In this V-drive system, engine is mounted in the hull at a stern portion in a not inclined posture and with the output end being directed toward the stem of boat. On the front of lower portion of such engine is disposed a clutch means. Power transmission path is turned from a horizontal direction to a rearwardly and downwardly inclined direction by gearing means which is disposed on the front of the clutch means. Marine propulsion device of this drive system is called V-drive system because horizontal transmission path from the engine to the output end of clutch means is followed by inclined transmission path as from the gearing means so that power transmission path from the engine to propeller is V-letter shaped as a whole. As compared to another drive system such as the one in which the engine is mounted in a downwardly inclined posture with the output end of such engine being directed toward the stern of boat and in which power transmission path as from such engine to propeller is made straight along a rearwardly and downwardly inclined direction, the V-drive system provides a distinct advantage that an enlarged dwelling space is afforded in a pleasure boat or the like. This is because the V-letter shaped power transmission path of the V-drive system permits placing the engine nearer to the stern of boat as compared to another drive system and because the engine mounted in a not inclined posture occupies a minimum height as a whole. Enlargement of dwelling space is very important in a pleasure boat.

In employing V-drive or similar drive system having a transmission path which includes a bend or turn of direction, there is a problem how the bend or turn of transmission path is provided while insuring a smooth power transmission. The conventional way for solving this problem is the use of bevel gears in that a pair of mutually meshed bevel gears are fixedly provided on the output shaft of clutch means and a transmission shaft coupled to a propeller shaft. This conventional way has a disadvantage in that gearing means comprising the pair of bevel gears is relatively large in scale. The conventional way further has a serious disadvantage that manufacturing of such bevel gears is very difficult and requires a large cost. That is, the angle of downward inclination of the propeller shaft is about fifteen degrees (15°) and bevel gears having a large cone distance of about 330 millimeters are required for bending or turning the power transmission path by such small angle. Manufacturing of bevel gears having such large cone distance requires a very large manufacturing machine, which makes such manufacturing difficult and very expensive.

PRIOR ART

U.S. Pat. No. 3,636,909 (Benson, Jr.) and U.S. Pat. No. 3,589,326 (Aldo Celli) disclose, respectively, use of a pair of universal joints for solving the mentioned problem.

OBJECT OF THE INVENTION

A primary object of the present invention is to provide an improved marine propulsion device of the type set forth at the beginning having a novel gearing means which is compact in scale and is provided with a low manufacturing cost.

SUMMARY OF THE INVENTION

According to the present invention, the object is attained in a marine propulsion device of the type set forth at the beginning by in which said gearing means is provided with a pair of mutually meshed spur gears which are mounted on said clutch output shaft and said transmission shaft, a first spur gear of said pair of spur gears being fixedly secured to the shaft mounting such first spur gear and a second spur gear of said pair of spur gears being connected operatively to the shaft mounting such second spur gear by means of a constant velocity universal joint which is disposed within said second spur gear on the shaft mounting such second spur gear. The first and second spur gears may be either conventional spur gears each having teeth parallel to the axis of such gear or helical spur gears each having teeth diagonal to the axis of such gear. When the latter spur gears are employed, the contact ratio between the pair of spur gears is heightened.

In general, contact velocity universal joints are widely used in various industrial fields for an operative connection between two rotating shafts for achieving a torque transmission of constant velocity ratio therebetween when axes of such two shafts are offset from one another or when angular offset between such shafts occurs. Such two shafts are usually connected by using a pair of constant velocity universal joints. Contrarily to such use, a spur gear and a shaft mounting such spur gear are operatively connected, in the marine propulsion device according to the present invention, by means of a single constant velocity universal joint. Owing to the facts that constant velocity universal joints may be manufactured with ease and are offered with a low cost owing to a wide use of various industrial fields, that only one constant velocity universal joint is employed for the required connection and that spur gears are employed which may be manufactured with ease and are offered with a low cost, the marine propulsion device according to the present invention may be manufactured with ease and with a cost much lower as compared to a propulsion device having gearing means comprising bevel gears. In the propulsion device according to the present invention, the single constant velocity universal joint is disposed within a spur gear so that such universal joint requires no additional space. The mutually meshed spur gears occupies a space much smaller than mutually meshed bevel gears. The marine propulsion device according to the present invention is thus compactly fashioned which comprises small-scaled gearing means. In spite of the fact that propeller shaft and propeller are driven to rotate with a high speed of rotation such as about 900 to 1500 r.p.m., the propulsion device according to the present invention causes no variation in torque as well as no vibration at the gearing means owing to the employment of constant velocity universal joint.

Constant velocity universal joint which may preferably be employed in the marine propulsion device according to the present invention is so-called Birfield type joint such as the one disclosed, for example, in U.S. Pat. No. 2,838,919. In a preferred embodiment of the present invention, the single constant velocity universal joint is thus fashioned such that it comprises; an outer race member which is secured to said second spur gear and which is formed at spherical inner surface thereof with a plurality of meridian race grooves, an inner race member which is mounted on the shaft mounting said second spur gear not rotatably relative to the said shaft and which is formed at spherical outer surface thereof with a plurality of meridian race grooves, a series of torque transmitting balls which engage said outer and inner race members in said race grooves, and a ball retaining member which is fitted into clearance between said outer and inner race members for locating said torque transmitting balls. In a constant velocity universal joint of this type, a series of balls for transmitting torque are interposed between coaxially arranged ring-like outer and inner race members. Such joint may thus be equipped within a spur gear with ease in the fashion recited above.

In case the constant velocity universal joint of the above mentioned type is employed in the device according to the present invention, the outer race member of such joint may either be secured to the spur gear associated therewith by securing means or be formed integrally with such spur gear. In the former case, universal joints on the market may be used as they are. In the latter case in which outer race member is integral with a spur gear, the number of parts is reduced and assembling of the gearing means is made easier.

With respect to pleasure boats and similar boats, it is often true that mounting positions for engine, clutch means and the like are decided in designing the hull of boat. In a further aspect of the present invention, consideration is taken for equipping with ease the propulsion device according to the present invention in a pleasure boat or the like having such predetermined layout. With respect to boats having predetermined layouts, the angle of inclination of the propeller shaft differs somewhat on each boat. From this, consideration is taken for varying or adjusting with ease the angle of inclination of the described transmission shaft of the gearing means to which shaft the propeller shaft is fixedly coupled.

For this, in case when a constant velocity universal joint is mounted on the transmission shaft within a spur gear mounted on such a transmission shaft, a transmission casing for the gearing means is provided at the output end portion thereof with a separate casing part which may be fixed to the remainder of the transmission casing after varying inclination of the same and the transmission shaft is rotatably supported by the transmission casing at such separate casing part. In this case, by varying or adjusting inclination of the separate casing part, the angle of inclination of the transmission shaft which is supported by such separate casing part may be varied or adjusted in correspondence to the angle of inclination to be given to the propeller shaft. Such adjustment of the angle of inclination of the transmission shaft will cause no trouble in power transmission owing to the fact that the transmission shaft is connected to the spur gear mounted thereon by means of a constant velocity universal joint. This is beyond expectation in a gearing means having a pair of bevel gears in which the angle of inclination of a transmission shaft to which a propeller shaft is to be coupled is definitely determined by the bevel gears employed. The above mentioned separate casing part may be such that it is prepared in each angle of inclination to be given, but it is more desirable to fashion such separate casing part such that it is carried by the remainder of transmission casing through a partly cylindrical surface the center of which is positioned on the nodal axis of the constant velocity universal joint employed. In the latter case, the angle of inclination of the transmission shaft supported by the separate casing part may be varied or adjusted non-stepwise by rotating the casing part about the nodal axis of the universal joint with such part being guided by the cylindrical surface. Thereafter, the separate casing part is secured to the remainder of transmission casing.

For achieving with ease an adjustment of the inclination of the transmission shaft in the gearing means when a constant velocity universal joint is disposed between the clutch output shaft and spur gear mounted thereon, transmission casing for the gearing means is fashioned such that it may be fixed to housing for the clutch mechanism after varying the inclination of such transmission casing. In this case, although the relative angle between the clutch output shaft and spur gear mounted thereon is varied by varying the inclination of the transmission casing, no trouble in power transmission is caused, too, owing to the connection between such clutch output shaft and spur gear by means of a constant velocity univeral joint.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figures 1, 3:
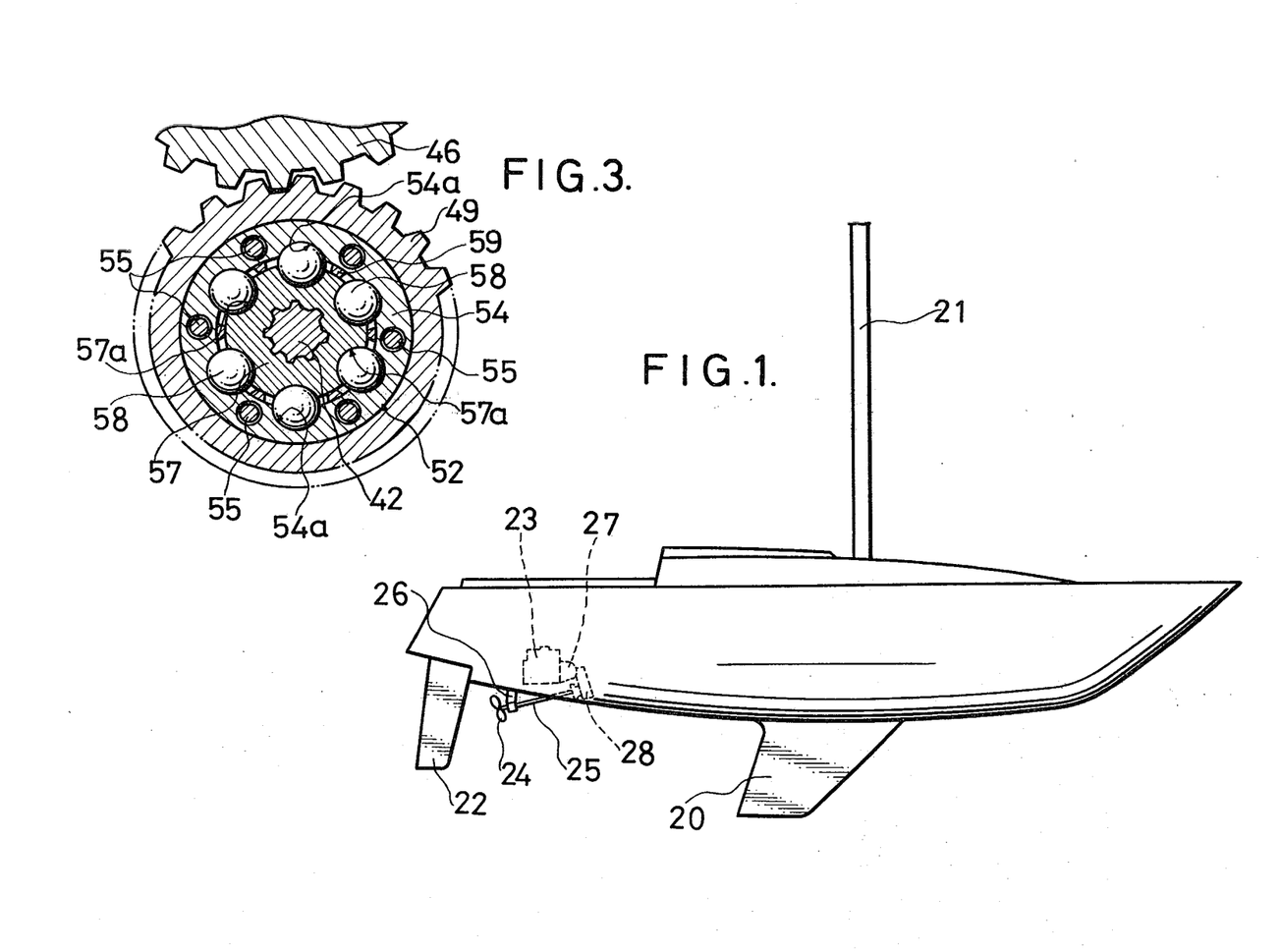
FIG. 1 is a schematic side elevational view of a boat in which a first embodiment of the marine propulsion device according to the present invention is equipped.
FIG. 3 is a sectional view taken along line III—III of FIG. 2 showing a part of the gearing means shown in FIG. 2.
Figure 2:
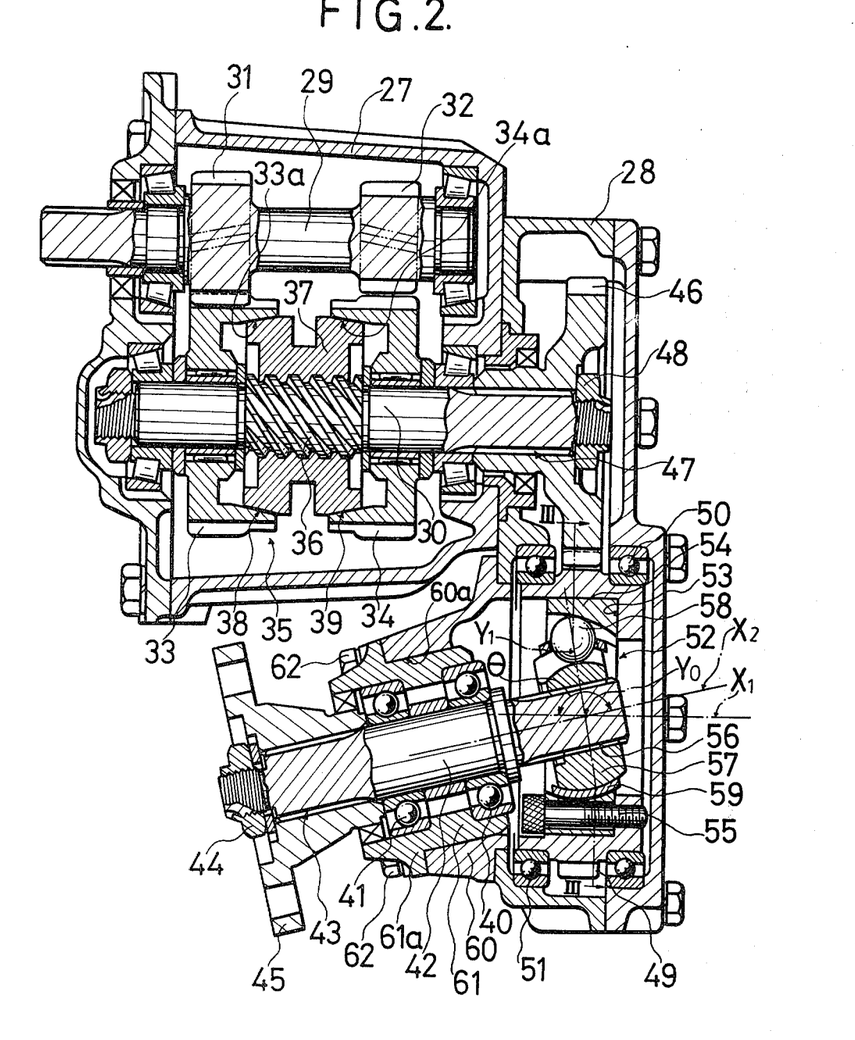
FIG. 2 is a sectional side view showing a clutch mechanism and gearing means employed in the marine propulsion device shown in FIG. 1.

Referring now to the drawings in which like numerals designate like parts throughout the several views thereof, there is shown a first preferred embodiment of the marine propulsion device according to the present invention in FIGS. 1 to 3. In a yacht or pleasure boat shown in FIG. 1 having a center board 20 at the bottom for stabilizing posture of the boat, a mast 21 on the deck and a rudder 22 at the stern end for steering the boat, and a power source or engine 23 is mounted at a stern portion in a posture having no substantial inclination. Propeller 24 which directly propells the boat is carried by an inclined propeller shaft 25 which extends rearwardly and downwardly from the bottom of hull. The propeller shaft 25 is journalled at a portion adjacent to the terminal end thereof by a shaft bracket 26 on the bottom of hull. The engine 23 is arranged so that output end of such engine is directed toward the stem of boat. So-called V-drive system is employed in which propulsion mechanism including the engine 23 and propeller shaft 25 having propeller 24 at the drive end forms, as a whole, a V-shaped configuration. On the front of the engine 23 is provided a clutch housing 27, and an inclined transmission casing 28 is provided between the clutch housing 27 and propeller shaft 25. Power of engine 23 is transmitted to the propeller shaft 25 through these clutch housing 27 and transmission casing 28.

Within the clutch housing 27 are rotatably arranged, as shown in FIG. 2, an input shaft 29 having a front end portion extending toward the engine 23 and an output shaft 30 having a terminal end portion extending into the transmission casing 28. As is usual, the input shaft 29 is coupled at the front end thereof to the engine 23 by coupling means not shown in the drawings. Between the input shaft 29 and output shaft 30 is arranged a clutch mechanism for transmitting rotation of the input shaft 29 to the output shaft 30 selectively in a direction of rotating the propeller shaft 25 in the forward propelling direction or backward propelling direction. This clutch mechanism includes a forward direction input gear 31 and backward direction input gear 32 each having a relatively small diameter both of which gears are formed integrally with the input shaft 29 and a forward direction output gear 33 and backward direction output gear 34 each having a relatively large diameter each of which gears is rotatably mounted on the output shaft 30 through bearing means. The forward direction output gear 33 is in constant mesh with the forward direction input gear 31, whereas the backward direction output gear 34 is in constant mesh with an idler gear which is not shown in the drawings and is in turn in constant mesh with the backward direction input gear 32. The clutch mechanism further includes a friction clutch 35 for connecting the forward direction output gear 33 and backward direction output gear 34 selectively to the output shaft 30. This friction clutch 35 comprises a movable clutch member 37 which is mounted on the output shaft 30 slidably but not rotatably relative to such shaft by utilizing helical spline shaft portion 36 of the shaft 30 between the output gears 33 and 34. This movable clutch member 37 has a cone-shaped friction surface 38 which is frictionally engageable with a cone-shaped friction surface 33a formed to the forward direction output gear 33 and another cone-shaped friction surface 39 which is frictionally engageable with a cone-shaped friction surface 34a formed to the backward direction output gear 34. The friction clutch 35 connects the forward direction output gear 33 to the output shaft 30 when the movable clutch member 37 is shifted toward the left as viewed in FIG. 2 to cause a frictional engagement between the friction surfaces 38 and 33a. Conversely, the clutch 35 connects the backward direction output gear 34 to the output shaft 30 when the clutch member 37 is shifted toward the right as viewed in FIG. 2 to cause a frictional engagement between the friction surfaces 39 and 34a. The output shaft 30 may thus be driven to rotate selectively by the input shaft 29 with a reduced speed of rotation into forward or backward propelling direction by connecting selectively the forward direction output gear 33 or backward direction output gear 34 to the output shaft 30. An example of friction clutch of this type and handling means for such clutch is disclosed in U.S. Pat. No. 3,269,497.

Within the transmission casing 28 is provided a gearing means for drivingly connecting the output shaft 30 of clutch mechanism having the friction clutch 35 to the propeller shaft 25. As also shown in FIG. 2, the transmission casing 28 rotatably supports at below the clutch output shaft 30 an inclined transmission shaft 42 through a pair of bearings 40 and 41. This transmission shaft 42 projects at the terminal end portion thereof outwardly from the casing 28 and is aligned coaxially with the propeller shaft 25. On the terminal end portion of transmission shaft 42 is fixedly mounted a coupling half 45 by utilizing a spline connection 43 and a nut 44 threadedly mounted on the shaft 42. The transmission shaft 42 is fixedly coupled to the propeller shaft 25 by fastening another coupling half (not shown in the drawings) fixedly mounted on the base end portion of the propeller shaft 25 to the former coupling half 45. The transmission shaft 42 is inclined relative to the horizontally arranged clutch output shaft 30 by about fifteen degrees (15°). A particular consideration according to the present invention is taken for connecting these shafts 30 and 42, as will be detailed hereinafter.

On the terminal end portion of the clutch output shaft 30 is fixedly mounted a spur gear 46 at within the transmission casing 28, as shown in FIG. 2. This spur gear 46 is mounted on the shaft 30 through a spline connection 47 and is fixed in position by a nut 48 threadedly mounted on the end portion of the shaft 30. On the base end portion of the transmission shaft 42 is mounted another spur gear 49 which is constantly meshed with the former spur gear 46 on the output shaft 30. The spur gear 49 is rotatably supported at the outer periphery of boss portion thereof by the transmission casing 28 through a pair of bearings 50 and 51. The spur gear 49 which is mounted on the transmission shaft 42 having an inclination is operatively connected to such shaft 42 by means of constant velocity universal joint 52, as will be detailed hereinafter.

As shown in FIGS. 2 and 3, this constant velocity universal joint 52 is fashioned to a joint of so-called Birfield-type which is disclosed in, for example, U.S. Pat. No. 2,838,919. The spur gear 49 is formed into the one having a hollow space of a large diameter inner wall of which space has an annular stepped portion 53. To the hollow space of the gear 49 is fitted an annular outer race member 54 having partly spherical inner surface which member abuts at the inner face thereof against the stepped portion 53. This outer race member 54 is secured to the spur gear 49 by means of a plurality of bolts 55 which are arranged intermittently along a circular direction. On the transmission shaft 42 is mounted by means of a spline connection 56 an inner race member 57 having partly spherical outer surface. The partly spherical inner surface of outer race member 54 and the partly spherical outer surface of inner race member 57 are formed, respectively, with a plurality of meridian race grooves 54a and 57a, and a series of torque transmitting balls 58 are interposed between the race members 54 and 57. A part and another part of each ball 58 is inserted into the race grooves 54a and 57a, respectively. A ball retaining member or cage 59 having apertures for receiving and locating the torque transmitting balls 58 are fitted into the clearance between the spherical inner surface of outer race member 54 and the spherical outer surface of inner race member 57. When the outer race member 54 rotates together with the spur gear 49, the torque transmitting balls 58 engage the side walls of the race grooves 54a and 57a with an appropriate pressure angle and transmits torque from the outer race member 54 to the inner race member 57. Centers of the series of balls 58 are constantly positioned on a plane $Y_1$ which contains the nodal point $Y_0$ of the joint 54, namely point of intersection between the axis $X_1$ of spur gear 49 and the axis $X_2$ of transmission shaft 42, and which bisects angle of intersection $\theta$ between the axes $X_1$ and $X_2$. Accordingly, transmission of torque from the outer race member 54 to the inner race member 57 and, therefore, from the spur gear 49 to the transmission shaft 42 is achieved with a constant velocity ratio. During such transmission of torque, variation in rotation torque is not caused. Because constant velocity universal joint of this type are well known, further detailed descriptions on the joint 52 will be omitted. It is, however, to be noted that only one constant velocity universal joint 52 is employed for connecting the spur gear 49 operatively to the inclined transmission shaft 42 and that such universal joint 52 is disposed within the spur gear 49.

In the marine propulsion device of the first embodiment, a special consideration is taken which, in assembling the device, permits to vary the angle of inclination of the transmission shaft 42 with ease so that the angle of inclination of the propeller shaft 25 which is to be connected to the transmission shaft 42 can be varied or adjusted with ease. As shown in FIG. 2, an annular and inclined casing part 60 is secured to the rear end of lower half of the transmission casing 28 and the transmission shaft 42 is received or supported by the aforementioned bearings 40 and 41 at within such casing part 60. This casing part 60 is formed therethrough with an inclined cylindrical bore 60a having an inner diameter larger than the outer diameter of each of the bearings 40 and 41. Into the cylindrical bore 60a is fitted a cylindrical bearing holder 61 having a flange 61a which abuts against the end face of the casing part 60. The bearings 40 and 41 are particularly held by the bearing holder 61 which is formed separately from the casing part 60. The bearing holder 61 is secured at the flange 61a thereof to the casing part 60 by a plurality of bolts 62.

Consequently, by using a casing part 60 in which angle of inclination of the cylindrical bore 60a has been varied, angle of inclination of the bearing holder 61 which is to be fitted into and secured to such casing part 60 may be varied. Angle of inclination of the transmission shaft 42 which is supported by such holder 61 through the bearings 40 and 41 and that of the propeller shaft 25 which is to be fixedly coupled to such transmission shaft 42 may thus be varied. Necessity of varying or adjusting angle of inclination of this kind may occur when the marine propulsion device according to the present invention is to be equipped to a boat in which space or location for mounting engine 23 and/or clutch housing 27 has previously be decided. In such a case, the structure shown permits to vary of adjust angle of inclination of the propeller shaft 25 with ease. Such adjustment of angle of inclination of the transmission shaft 42 and propeller shaft 25 will cause no trouble in power transmission owing to the fact that the transmission shaft 42 is connected to the spur gear 49 by means of constant velocity universal joint 52. The casing part 60 may be secured to remainder of the transmission casing 28 either by welding or by deattachable securing means such as bolts.

The marine propulsion device shown in FIGS. 1 to 3 propells the boat, when the movable clutch member 37 becomes engaged to the forward direction output gear 33 or backward direction output gear 34 from the neutral state of the friction clutch 35 in which the clutch member 37 is disengaged from both of the output gears 33 and 34, by transmitting power of engine 23 to the propeller shaft 25 so as to rotate the propeller 24 into forward propelling direction or backward propelling direction. Although the propeller 24 is driven to rotate with a high speed of rotation of about 900 to 1500 r.p.m., the constant velocity universal joint 52 provided in the power transmission path does not cause variation in torque as well as vibration. This is not true when a universal joint of non-constant velocity ratio type be employed in place of the joint 52.

Figure 4:
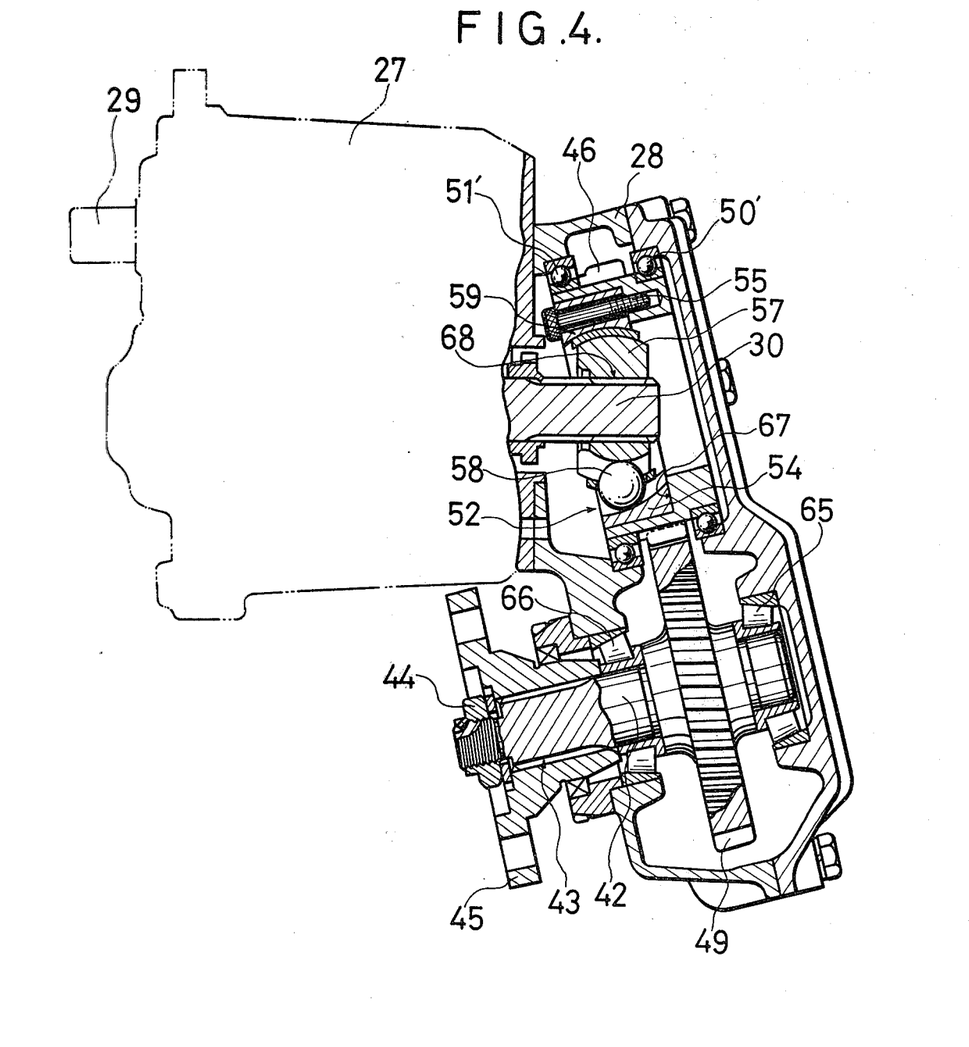
FIG. 4 is a sectional side view showing a gearing means employed in a second embodiment of the marine propulsion device according to the present invention.

In the first embodiment having been detailed hereinbefore, constant velocity universal joint 52 is employed for operatively connecting the transmission shaft 42 to the spur gear 49 which is mounted on such shaft 42 in an inclined posture relative to the shaft 42. Contrarily to this, the propulsion device according to the present invention may also be fashioned such that spur gear 46 which is to be mounted on the clutch output shaft 30 is mounted on such output shaft 30 in an inclined posture and such spur gear 46 is connected operatively to the output shaft 30 by means of constant velocity universal joint. In FIG. 4, there is shown a second embodiment of the present invention in which such structure is employed. In the marine propulsion device shown in FIG.

4, the transmission shaft 42 is inclined rearwardly and downwardly, as is the case of the transmission shaft 42 in the device shown in FIGS. 1 to 3, but spur gear 49 mounted on such transmission shaft is co-axially arranged on the shaft 42 and is secured to such shaft 42. Spur gear 46 which is meshed with the spur gear 49 having an inclined posture corresponding to the inclination of transmission shaft 42 is mounted on the clutch output shaft 30 in an inclined posture corresponding to that of the spur gear 49. The spur gear 46 is rotatably supported at the outer periphery of boss portion thereof by the transmission casing 28 through a pair of bearings 50' and 51', whereas the transmission shaft 42 fixedly mounting the spur gear 49 is rotatably supported by the casing 28 through a pair of bearings 65 and 66. Each of the spur gears 46 and 49 of this embodiment is formed to helical spur gear, as shown in FIG. 4 with respect to the spur gear 49, so as to heighten the contact ratio between the spur gears 46 and 49, that contributes toward a decrease in noise. On the terminal end portion of transmission shaft 42 extending outwardly from the transmission casing 28 is fixedly mounted a coupling half 45 by utilizing means 43 and 44 similar to those employed in the first embodiment. Clutch mechanism in the clutch housing 27 is omitted from FIG. 4 but is structured similarly to the one employed in the first embodiment.

In the second embodiment shown in FIG. 4, the helical spur gear 46 on the clutch output shaft 30 is formed to a gear having a hollow space of a large diameter inner wall of which space has an annular stepped portion 67. Within the helical spur gear 46 and on the output shaft 30 is provided a constant velocity universal joint 52 comprising an annular outer race member 54 which is fitted into the hollow space of gear 46 by abutting such member at the inner face thereof against the stepped portion 67 and is secured to the gear 46 by bolts 55, an inner race member 57 which is mounted on the output shaft 30 by a spline connection 68, a series of torque transmitting balls 58 which engage the race members 54 and 57 in meridian race grooves of such race members, and a ball retaining member 59 which is interposed between the race members 54 and 57 for locating the torque transmitting balls 58. As can be understood with ease, the constant velocity universal joint 52 employed in the marine propulsion device shown in FIG. 4 constitutes a compact connecting or coupling means and transmits rotation torque from the clutch output shaft 30 to the spur gear 46 on such shaft 30 with constant velocity ratio and without causing variation in torque, too.

Figure 5:
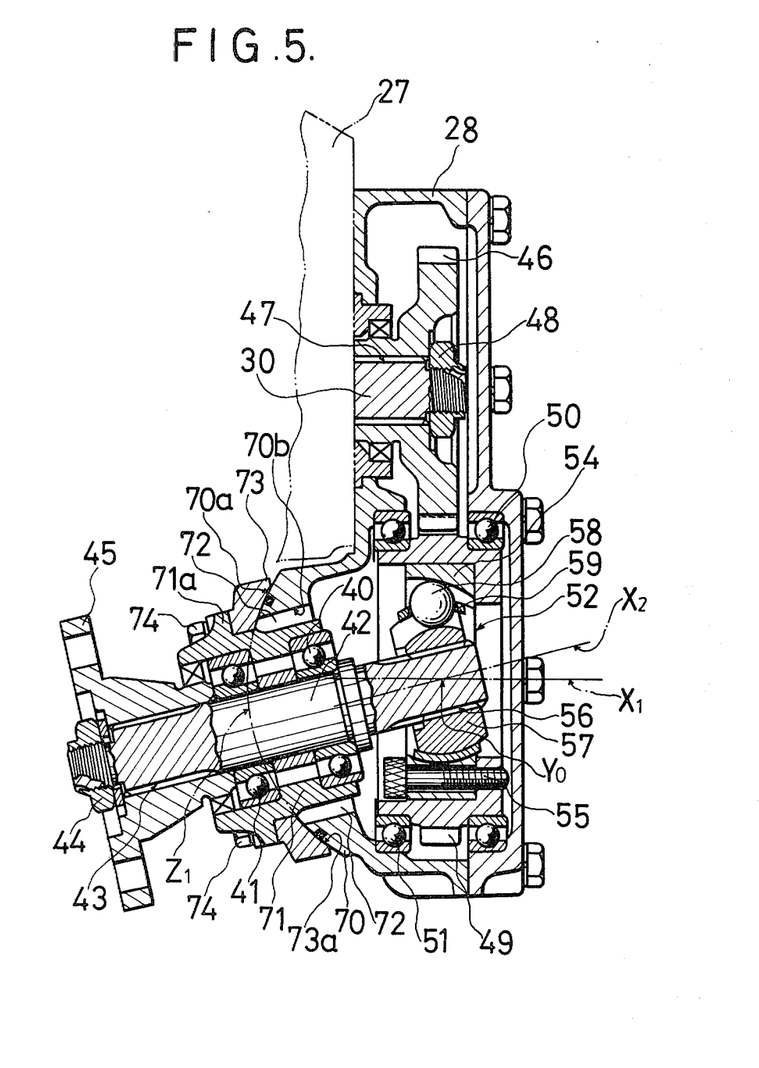
FIG. 5 is a sectional side view showing a gearing means employed in a third embodiment of the marine propulsion device according to the present invention.

Turning to a consideration of FIG. 5, there is shown in this figure a third embodiment of the marine propulsion device according to the present invention which is fashioned such that angle of inclination of the transmission shaft 42 may be varied or adjusted. As can be seen from FIG. 5, the propulsion device of this third embodiment is structured approximately similarly to the one shown in FIGS. 1 to 3 and a constant velocity universal joint 52 is disposed within the spur gear 49 at on the transmission shaft 42. In the marine propulsion device shown in FIG. 5, however, the rear wall 70 of lower half of the transmission casing 28 is formed at the rear or outer surface thereof with a carrying seat 70a in the form of partly cylindrical surface which constitutes a part of imaginary cylindrical surface $Z_1$ the center of which is positioned on the nodal point or axis $Y_0$ of the universal joint 52. A cylindrical bearing holder 71 which holds bearings 40 and 41 for the transmission shaft 42 is inserted at the base portion of such holder into the transmission casing 28 through an opening 70b in the wall 70 which opening is particularly formed to have a diameter substantially larger than the outer diameter of the base portion of the bearing holder 71 so that clearance 72 permitting an adjustment of angle of inclination of the bearing holder 71 is afforded at around such holder 71. The bearing holder 71 is formed at a portion adjacent the end thereof with a flange 71a. Between the rear wall 70 and the flange 71a of the holder 71 is interposed an annular adjusting piece 73 having partly cylindrical inner surface 73a which is in an intimate contact with the carrying seat 70a of rear wall 70. The bearing holder 71 is secured at the flange 71a thereof to the adjusting piece 73 by a plurality of bolts 74. Another parts of the propulsion device shown in FIG. 5 are structured similarly to the corresponding parts shown in FIG. 2 and are designated by like reference numerals used in FIG. 2.

In the third embodiment shown in FIG. 5, angle of inclination of the bearing holder 71 as well as that of the transmission shaft 42 and, therefore, angle of inclination of the propeller shaft 25 to be coupled to the transmission shaft 42 may be varied non-stepwise by rotating the adjusting piece 73 relative to the rear wall 70 about the nodal point or axis $Y_0$ with the cylindrical inner surface 73a of such piece 73 being guided by the carrying seat 70a. Accordingly, angle of inclination of the transmission shaft 42 and, therefore, that of the propeller shaft 25 may be adjusted by securing the adjusting piece 73 to the rear wall 70 after varying angle of inclination of such adjusting piece in the above explained manner. Owing to the connection between the spur gear 49 and transmission shaft 42 by means of constant velocity universal joint 52, such adjustment of angle of inclination of the transmission shaft 42 will cause, as is the case in the propulsion device shown in FIG. 1 to 3, no trouble in transmitting propelling power. The adjusting piece 73 is secured to the rear wall 70 by welding or by bolts or the line. When the piece 73 is to be secured by bolts, it is satisfactory that each of bolt passing bores to be formed to the adjusting piece 73 will be formed into an elongated bore extending along the direction of adjusting rotation of such piece 73 about the nodal point or axis $Y_0$ and that each of bolt receiving threaded bores to be formed to the rear wall 70 will be formed into a bore which is directed to the nodal point or axis $Y_0$.

Figures 6, 7:
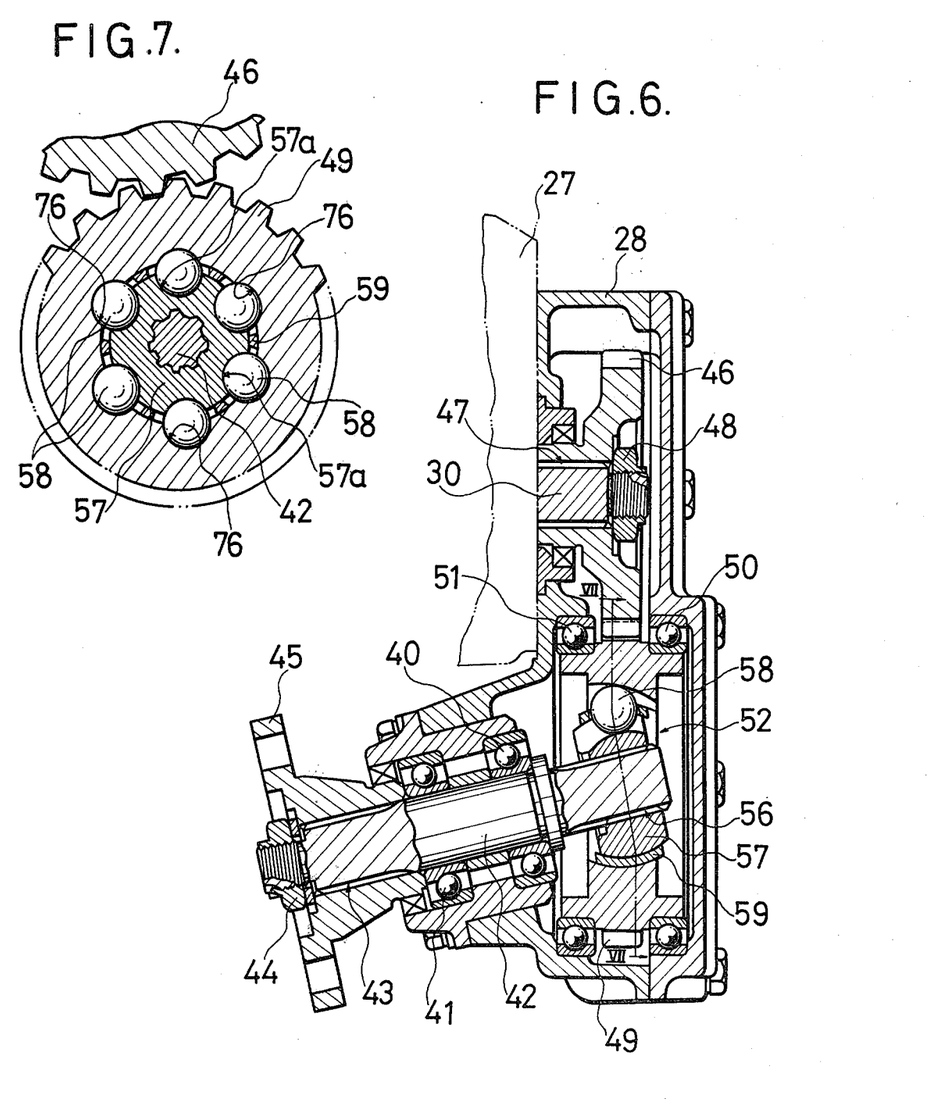
FIG. 6 is a sectional side view similar to FIG. 5 but showing a fourth embodiment of the marine propulsion device according to the present invention.
FIG. 7 is a sectional view taken along line VII—VII of FIG. 6 showing a part of gearing means shown in FIG. 6.

In each of the embodiments having been detailed hereinbefore, the outer race member 54 of constant velocity universal joint 52 is formed separately from spur gear 49 or 46 associated with such universal joint 52 and such outer race member 54 is secured to the spur gear 49 or 46 by securing means 55. Such outer race member may be formed integrally with a spur gear 49 or 46 and, by doing so, number of machine parts is reduced and assembling of the machine is made easier. In FIGS. 6 and 7 and in FIG. 8, there are shown respectively a fourth embodiment and fifth embodiment of the present invention in which such outer race member is employed.

In the fourth embodiment shown in FIGS. 6 and 7, a constant velocity universal joint 52 is disposed within the spur gear 49 at on the transmission shaft 42. Contrarily to each of the universal joints 52 employed in the previous embodiments, the constant velocity universal joint 52 employed in this embodiment has a separate outer race member 54 no more. In place of such separate outer race member, the inner surface of spur gear 49 defining a hollow space within the gear 49 is shaped into partly spherical surface which is formed with a plurality of meridian race grooves 76 into which parts of torque transmitting balls 58 are inserted. Another parts of the constant velocity universal joint 52 employed in this fourth embodiment are structured in a fashion similar to the corresponding parts of the universal joint employed in each of the aforeexplained embodiments.

Figure 8:
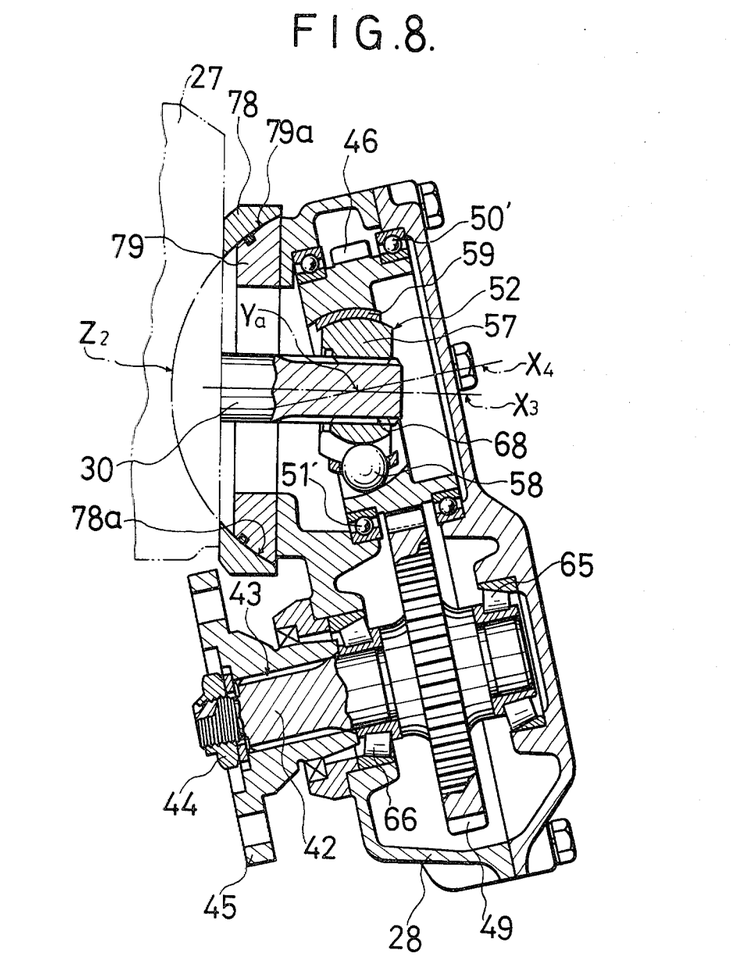
FIG. 8 is a sectional side view similar to FIG. 5 but showing a fifth embodiment of the marine propulsion device according to the present invention.

The fifth embodiment shown in FIG. 8 is an example of the use of constant velocity universal joint 52 for connecting a spur gear 46 mounted on the clutch output shaft 30 in an inclined posture drivenly to the shaft 30. In this fifth embodiment, a separate outer race member is also omitted by shaping the inner face of spur gear 46, which defines a hollow space within the gear 46, similarly to that of the aforesaid outer race member 54.

The fifth embodiment shown in FIG. 8 is further fashioned such that the transmission casing 28 may be secured to the clutch housing 27 after varying the inclination of such casing 28, whereby the inclination of transmission shaft 42 and, therefore, that of propeller shaft 25 may be adjusted. For this, a seat member 78 which is arranged on the front surface of clutch housing 27 and is secured to such housing is provided with partly cylindrical surface 78a which constitutes a part of imaginary cylindrical surface $Z_2$ having its center on the nodal point or axis Ya which is located at the intersection of axis $X_3$ of the output shaft 30 and axis $X_4$ of the spur gear 46. On the base end surface of the upper half of transmission casing 28 is secured an annular adjusting piece 79 having partly cylindrical surface 79a which is in an intimate contact with the cylindrical surface 78a. The adjusting piece 79 is secured to the seat member 79 after the inclination of transmission casing 28 has been varied or adjusted by rotating the seat member 79 about the nodal point or axis Ya with such piece 79 being guided by the cyindrical surface 78a of seat member 78. In this fifth embodiment, the inclination or inclined angle of propeller shaft 25 which is to be coupled to the transmission shaft 42 is thus varied or adjusted by varying or adjusting inclination of the entire transmission casing 28 so as to vary or adjust the inclination or inclined angle of transmission shaft 42 which is carried by the casing 28. Owing to the connection between the clutch output shaft 30 and spur gear 46 by means of constant velocity universal joint 52, such adjustment of inclination of the transmission casing 28 which results in a variation in angle of intersection between the axes of output shaft 30 and spur gear 46 will cause no trouble in transmitting boat propelling power. Another parts of the propulsion device of this fifth embodiment are structured similarly to the corresponding parts of the second embodiment.

Figure 9:
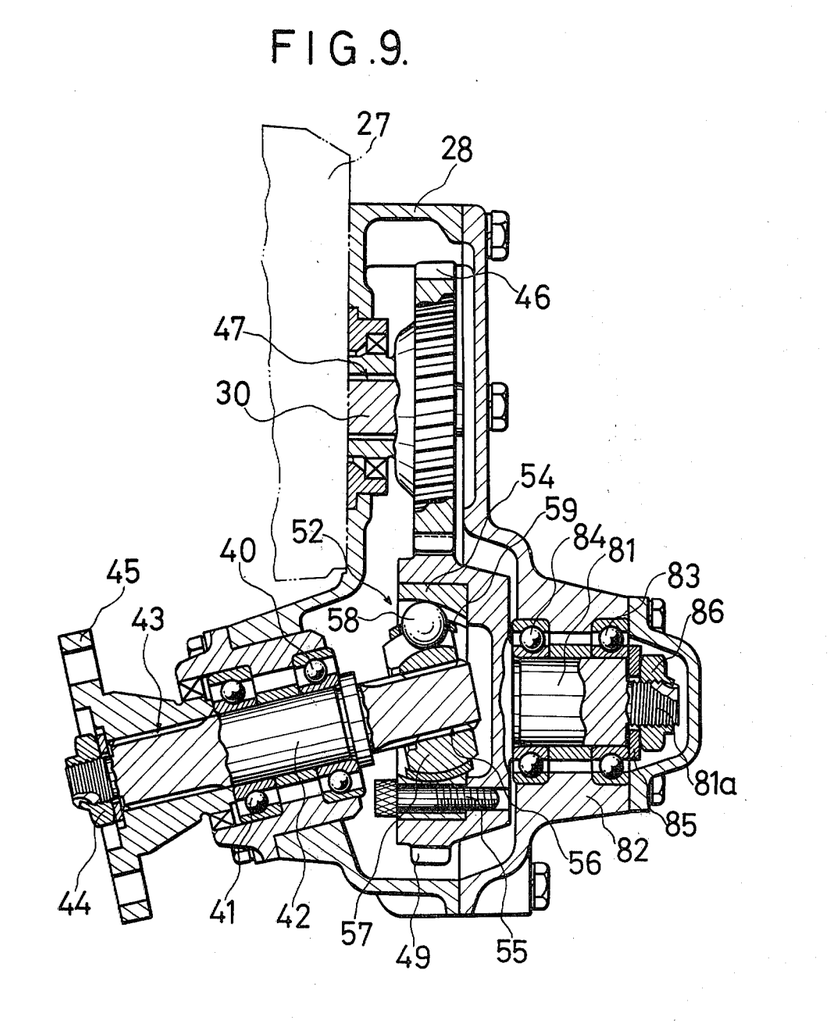
FIG. 9 is a sectional side view similar to FIG. 5 but showing a sixth embodiment of the marine propulsion device according to the present invention.

In each of the embodiments having been detailed hereinbefore, a pair of bearings 50, 51 or 50', 51' are provided on the outer periphery of boss portion of a spur gear 49 or 46, within which a constant velocity universal joint 52 is disposed, for rotatably supporting such spur gear. In such case, however, bearings each having a diameter larger than that of the spur gear 49 or 46 are required. In FIG. 9 and in FIG. 10, there are shown respectively a sixth embodiment and seventh embodiment of the present invention in which consideration is taken for reducing diameter of such bearings.

In the sixth embodiment shown in FIG. 9, spur gear 49 within which a constant velocity universal joint 52 is disposed has an integrally formed shaft 81 which is projected forwardly from the boss portion of such gear 49. Cover of the transmission casing 28 is formed with a hollow cylindrical portion 82 which surrounds the shaft 81. The spur gear 49 is rotatably supported by means of a pair of bearings 83 and 84 which are held by the cylindrical portion 82. Undoubtedly, the diameter of such bearings 83 and 84 may be made much smaller than that of the aforestated bearings 50 and 51. The shaft 81 has a threaded end portion 81a having a reduced diameter on which a ring 85 and nut 86 are mounted for preventing the falling-out of bearings 83 and 84. In this sixth embodiment, outer race member 54 of the constant velocity universal joint 52 is formed separately from the spur gear 49. Further, spur gears 46 and 49 employed in this sixth embodiment are formed to helical spur gears, as shown in FIG. 9 with respect to the spur gear 46.

Figure 10:
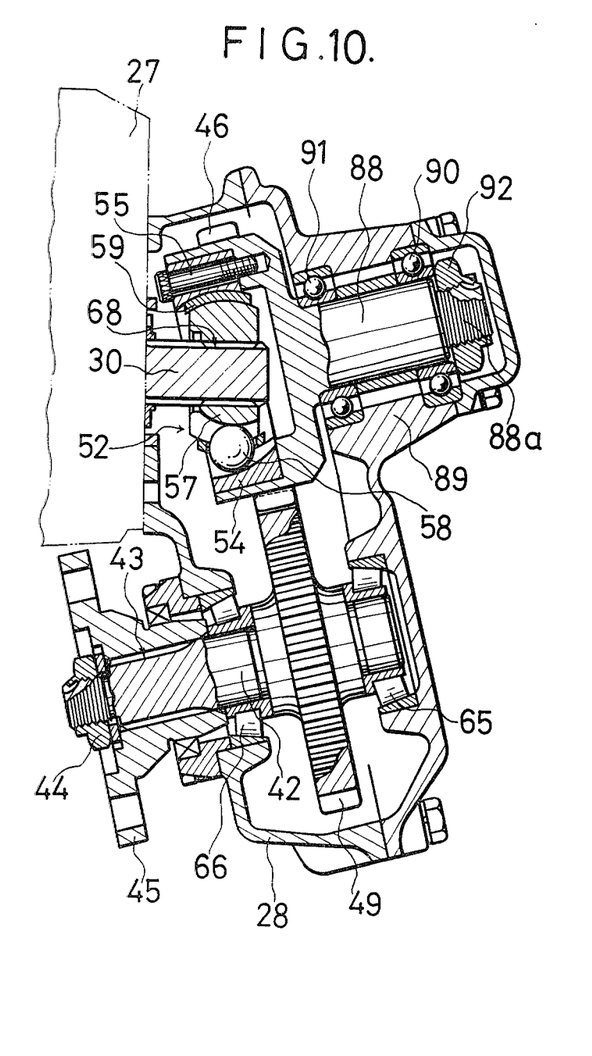
FIG. 10 is a sectional side view similar to FIG. 5 but showing a seventh embodiment of the marine propulsion device according to the present invention.

In the seventh embodiment shown in FIG. 10, spur gear 46 within which a constant velocity universal joint 52 is disposed has a shaft 88 which is formed integrally with the gear 46 and is projected forwardly from the boss portion of such gear. The spur gear 46 is rotatably supported by the transmission casing 28 through a pair of bearings 90 and 91 which are held by a hollow cylindrical portion 89 formed to the cover of transmissiion casing 28. In this case, too, the diameter of bearings 90 and 91 may be much smaller that that of the aforestated bearings 50' and 51'. The shaft 88 has a threaded end portion 88a having a reduced diameter on which a nut 92 is mounted for preventing the falling-out of bearings 90 and 91. In this seventh embodiment, too, outer race member 54 of the constant velocity universal joint 52 is formed separately from the spur gear 46.

The idea of reducing diameter of bearings having been detailed hereinbefore has been developed to reach another idea that separate bearing means for a spur gear within which a constant velocity universal joint 52 is disposed are omitted. This another idea is realized in an eighth embodiment shown in FIG. 11 and in a ninth embodiment shown in FIG. 12, respectively.

Figure 11:
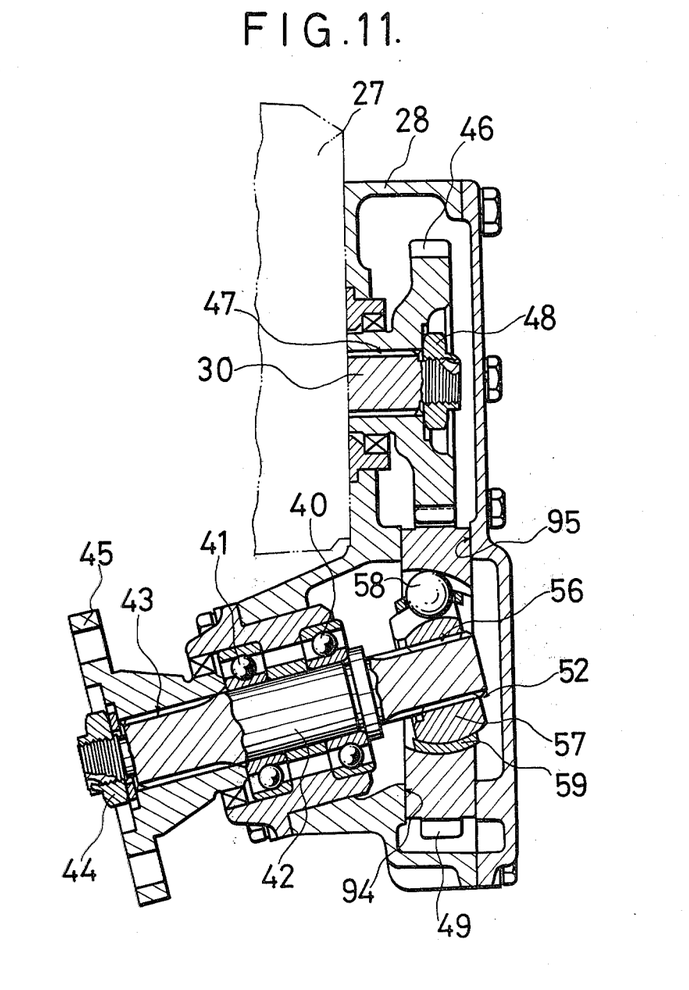
FIG. 11 is a sectional side view similar to FIG. 5 but showing an eighth embodiment of the marine propulsion device according to the present invention.

In the eighth embodiment shown in FIG. 11, there are provided no separate bearings for the spur gear 49 within which a constant velocity universal joint 52 is disposed. Instead of such bearings, the transmission casing 28 is formed with annular bearing surfaces 94 and 95 with which side faces of the boss portion of the spur gear 49 may be in a slidable contact. This eighth embodiment is thus fashioned such that thrust applied to the spur gear 49 along the radial direction thereof is borne by the torque transmitting balls 58 of constant velocity universal joint 52 and vibration of the spur gear 49 is prevented by the bearing surfaces 94 and 95. In this case, there are provided an advantage of omission of separate bearing means and another advantage that the propulsion device may further be reduced in scale. In this eighth embodiment, outer race member of the constant velocity universal joint 52 is made integral with the spur gear 49.

Figure 12:
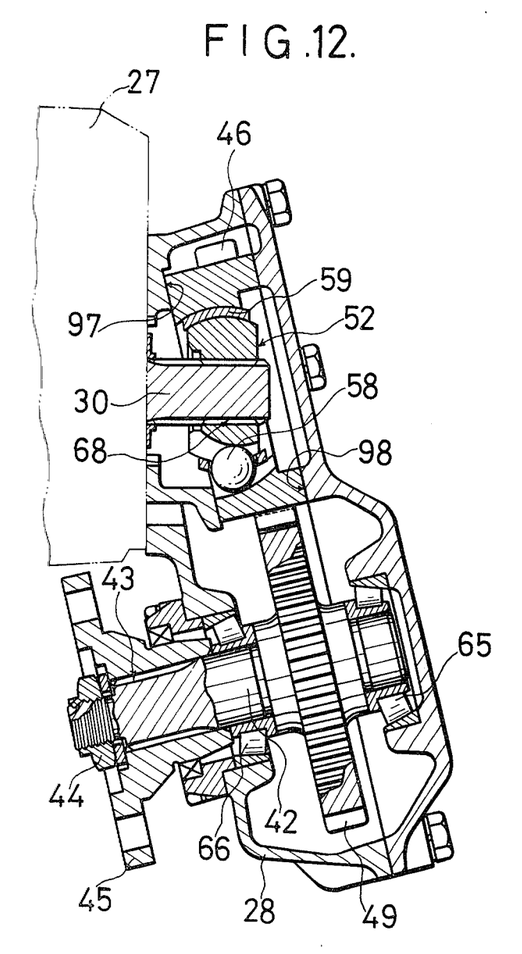
FIG. 12 is a sectional side view similar to FIG. 5 but showing a ninth embodiment of the marine propulsion device according to the present invention.

In the ninth embodiment shown in FIG. 12, the transmission casing 28 is formed, similarly in the eighth embodiment, with annular bearing surfaces 97 and 98 for preventing vibration of gear with which surfaces the boss portion of spur gear 46 having a constant velocity universal joint 52 therein is in a slidable contact. Radial thrust applied to the spur gear 46 is borne by the balls 58 of constant velocity universal joint 52. Outer race member of the universal joint 52 is integral with the spur gear 46.

All of the embodiments having been detailed hereinbefore concern V-drive system having been explained before. The marine propulsion device according to the present invention may, however, be realized or embodied as the one of another drive system such as the system shown in FIG. 13. In the drive system shown in FIG. 13, engine 23 is arranged reversely of the engine shown in FIG. 1 so that the output end of such engine 23 is directed toward the stern of boat. On the front of the engine 23 is disposed a clutch housing 27 which is followed by a transmission casing 28, and propeller shaft 25 extends outwardly from the hull along a rearwardly and downwardly inclined direction.

Figures 13, 14:
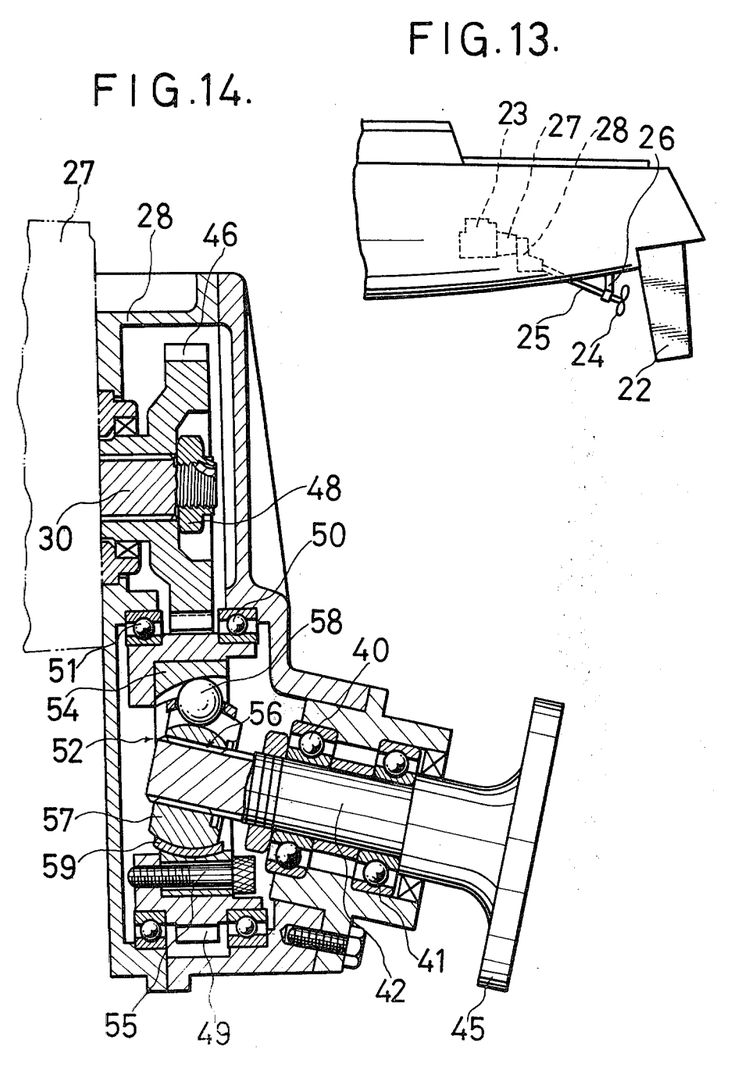
FIG. 13 is a schematic side view showing a part of boat in which a tenth embodiment of the marine propulsion device according to the present invention is equipped.
FIG. 14 is a sectional side view showing a gearing means employed in the marine propulsion device shown in FIG. 13.

In such drive system, a transmission shaft 42 to which the propeller shaft 25 is fixedly coupled is projected, as shown in FIG. 14, rearwardly and downwardly from the lower portion of transmission casing 28. As is the case of each of the previously explained embodiments, a pair of mutually meshed spur gears 46 and 49 are mounted on an output shaft 30 of clutch mechanism in the clutch housing 27 and on the transmission shaft 42. In the tenth embodiment shown in FIGS. 13 and 14, a constant velocity universal joint 52 is employed for an operative connection between the spur gear 49 and transmission shaft 42. This constant velocity universal joint 52 is disposed within the spur gear 49 at on the transmission shaft 42. In FIGS. 13 and 14, parts designated by previously used reference numerals are structured similarly to the corresponding parts in the previously explained embodiments.

The marine drive system shown in FIG. 13 is disadvantageous as compared to the V-drive system because it is obliged to put the engine 23 toward the stem of boat as compared to the case of V-drive system. In the event that a marine propulsion device of this drive system is fashioned according to the present invention, however, there is provided an advantage that a required inclination of propeller shaft 25 is provided without inclining the engine 23 so that height occupied by such engine 23 as a whole is saved. Further, in case when an engine of the horizontal type is employed as power source in the propulsion device of this drive system in which the present invention is embodied, mounting of such horizontal engine, which is obliged to be mounted at a mounting level higher than that for a vertical engine, will be made easier. This is because power delivering end from such horizontal engine to propeller shaft 25 may be lowered with ease by the gearing means comprising the pair of spur gears 46 and 49.

Having been described the invention by referring several embodiments thereof, it will be appreciated that structures of parts in these embodiments may be exchanged mutually so far as no contradiction occurs. Further, clutch mechcanism to be provided in the clutch housing 27 may, of course, be any of the known clutch means. The present invention is thus not limited by the particular embodiments shown.

What we claim is:

1. A marine propulsion unit comprising an engine, a propeller shaft carrying a propeller, a clutch mechanism for transmitting power from the engine to the propeller shaft, and gearing connecting an output shaft of the clutch mechanism to a transmission shaft which is aligned coaxially with and fixedly coupled to the propeller shaft, the transmission shaft and clutch output shaft being non-parallel and the gearing comprising first and second meshed spur gears which are mounted on the clutch output shaft and the transmission shaft respectively within a transmission casing for the gearing, the first spur gear being fixedly secured to the clutch output shaft and the second spur gear being connected operatively to the transmission shaft by means of a constant velocity universal joint which is disposed within the second spur gear, and the transmission casing being provided at the output end portion thereof with a separate casing part which is fixed to the remainder of the transmission casing, the transmission shaft being rotatably supported by the separate casing part through bearing means so that the angle of inclination of the transmission shaft is determined by the inclination of said separate casing part relative to the remainder of the transmission casing.

2. A marine propulsion unit according to claim 1, wherein the transmission casing is fashioned such that the separate casing part may be fixed to the remainder of the transmission casing after varying the inclination of the same.

3. A marine propulsion unit according to claim 2, wherein the separate casing part is carried by a partly cylindrical surface formed on the remainder of the transmission casing, the centre of which surface is positioned on the nodal axis of the constant velocity universal joint.

* * * * *